United States Patent
Nomura et al.

(10) Patent No.: US 6,485,672 B1
(45) Date of Patent: Nov. 26, 2002

(54) METHOD OF MANUFACTURING DIELECTRIC CERAMIC COMPOSITION AND ELECTRONIC DEVICE CONTAINING DIELECTRIC LAYER

(75) Inventors: Takeshi Nomura, Tokyo (JP); Shigeki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/673,957

(22) PCT Filed: Feb. 25, 2000

(86) PCT No.: PCT/JP00/01103

§ 371 (c)(1),
(2), (4) Date: Oct. 24, 2000

(87) PCT Pub. No.: WO00/51147

PCT Pub. Date: Aug. 31, 2000

(30) Foreign Application Priority Data

Feb. 26, 1999 (JP) ............................................. 11-49680

(51) Int. Cl.$^7$ ............................................. C04B 35/468
(52) U.S. Cl. ........................ 264/615; 264/614; 264/661; 264/666; 156/89.16
(58) Field of Search ................................. 264/614, 615, 264/666, 661; 156/89.16

(56) References Cited

U.S. PATENT DOCUMENTS

| | | | |
|---|---|---|---|
| 3,619,220 A | * 11/1971 | Maher | |
| 4,642,732 A | * 2/1987 | Ikeda | 361/321 |
| 4,925,817 A | * 5/1990 | Ikeda | 501/138 |
| 5,296,425 A | 3/1994 | Chazono et al. | |
| 5,571,767 A | * 11/1996 | Wilson | 501/139 |
| 5,835,339 A | 11/1998 | Sakamoto et al. | |

FOREIGN PATENT DOCUMENTS

| | | |
|---|---|---|
| JP | 06-005460 | 1/1994 |
| JP | A-6-52718 | 2/1994 |
| JP | A-6-84691 | 3/1994 |
| JP | 06-215979 | 8/1994 |
| JP | A-9-315861 | 12/1997 |
| JP | A-10-279353 | 10/1998 |
| JP | 10-312934 | 11/1998 |
| JP | A-11-3834 | 1/1999 |

* cited by examiner

Primary Examiner—James Derrington
(74) Attorney, Agent, or Firm—Oliff & Berridge, PLC

(57) ABSTRACT

A method of manufacturing a dielectric ceramic composition comprising at least a main component of $BaTiO_3$, a second subcomponent as represented by $(Ba, Ca)_xSiO_{2+x}$ (where, x=0.8 to 1.2), and other subcomponents. The main component and at least part of the subcomponents except the second subcomponent are mixed to prepare a pre-calcination powder and the pre-calcination powder is calcined to prepare a calcined powder. The second subcomponent is at least mixed in the calcined powder to obtain a dielectric ceramic composition having a ratio of each subcomponent to the main component of $BaTiO_3$ of a predetermined molar ratio. It is therefore possible to obtain an electronic device containing a dielectric layer such as a multi-layer ceramic capacitor able to satisfy both of the capacity-temperature characteristics of the X7R characteristic (EIA standard) and the B characteristic (EIAJ standard), even when the dielectric layer is a superthin one of not more than 4 μm and having a small change in the capacity under a DC electric field along with time and further having a long accelerated lifetime of the insulation resistance and a small drop in capacity under a DC bias.

13 Claims, 1 Drawing Sheet

METHOD OF MANUFACTURING DIELECTRIC CERAMIC COMPOSITION AND ELECTRONIC DEVICE CONTAINING DIELECTRIC LAYER

TECHNICAL FIELD

The present invention relates to a method of manufacturing a dielectric ceramic composition, a multi-layer ceramic capacitor, and other electronic devices containing a dielectric layer.

BACKGROUND ART

A multi-layer ceramic capacitor is being broadly used as a compact, large capacity, high reliability electronic device. The number used in each piece of electrical equipment and electronic equipment has also become larger. In recent years, along with the increasing miniaturization and improved performance of equipment, there have been increasingly stronger demands for further reductions in size, increases in capacity, reductions in price, and improvements in reliability in multi-layer ceramic capacitors.

Multi-layer ceramic capacitors are normally produced by stacking and firing a paste for formation of the internal electrodes and a slurry (paste) for formation of the dielectric using the sheet method or printing method etc. Generally Pd or a Pd alloy had been used for the internal electrodes, but Pd is high in price and therefore relatively inexpensive Ni or Ni alloys is now being used. When forming the internal electrodes by Ni or an Ni alloy, firing in the atmosphere ends up causing the electrodes to oxidize. Therefore, in general, after the binder is removed, the electrodes are fired at an oxygen partial pressure lower than the equilibrium oxygen partial pressure of Ni and NiO, then are heat treated to cause reoxidation of the dielectric layer (Japanese Unexamined Patent Publication (Kokai) No. 03-133116 and Japanese Patent No. 2787746).

If firing electrodes in a reducing atmosphere, however, the dielectric layer is reduced and the specific resistance ends up becoming smaller. Therefore, a reduction-resistant dielectric material which is not reduced even if fired in a reducing atmosphere has been proposed (I. Burn et al., "High Resistivity $BaTiO_3$ Ceramics Sintered in $CO—CO_2$ Atmospheres", *J. Mater. Sci.*, 10, 633 (1975); Y. Sakabe et al., "High-Permittivity Ceramics for Base Metal Monolithic Capacitors", pn., *J. Appl. Phys.*, 20 Suppl. 20–4, 147 (1981)).

A multi-layer ceramic capacitor using these reduction-resistant dielectric materials, however, suffers from the problems of a short high temperature accelerated lifetime of the insulation resistance and a low reliability. Further, there is the problem that the relative permittivity of the dielectric falls along with time. This is particularly remarkable under a DC electric field. If the dielectric layer is made thinner to make the multi-layer ceramic capacitor smaller and larger in capacity, the field intensity applied to the dielectric layer for giving the DC voltage becomes larger. Therefore, the change in the relative permittivity along with time ends up becoming much greater.

In the standard established in the EIA standard and known as "X7R", however, the rate of change of the capacity is set as within ±15% (reference temperature 25° C.) between −55° C. and 125° C. As a dielectric material satisfying the X7R characteristic, a $BaTiO_3+SrTiO_3+MnO$ based composition shown in for example Japanese Unexamined Patent Publication (Kokai) No. 61-36170 is known. This composition, however, suffers from a large rate of change of the capacity under a DC electric field. For example, if a DC electric field of 50V is applied for 1000 hours at 40° C., the rate of change of the capacity ends up becoming from −10% to −30% and the X7R characteristic can no longer be satisfied.

Further, in the standard of the capacity-temperature characteristic known as the B characteristic (EIAJ standard), the rate of change is set to within ±10% (reference temperature 20° C.) between −25° C. to 85° C.

Further, in addition, as a reduction-resistant dielectric ceramic composition, mention may be made of the $BaTiO_3+MnO+MgO$ disclosed in Japanese Unexamined Patent Publication (Kokai) No. 57-71866, the $(Ba_{1-x}Sr_xO)_aTi_{1-y}Zr_yO_2+\alpha((1-z)MnO+zCoO)+\beta((1-t)A_2O_5+tL_2O_3)+wSiO_2$ (where, A=Nb, Ta, V; L=Y or a rare earth element) disclosed in Japanese Unexamined Patent Publication (Kokai) No. 61-250905, barium titanate added with $Ba_2Ca_{1-a}SiO_3$ disclosed in Japanese Unexamined Patent Publication (Kokai) No. 2-83256, etc.

In all of these dielectric ceramic compositions, however, when the thickness of the dielectric layer is for example a super thin one of not more than 4 μm, it is extremely difficult to satisfy all of the characteristics of the capacity-temperature characteristic, the change in capacity under a DC electric field along with time, the accelerated lifetime of the insulation resistance, the drop in the capacity under a DC bias, etc. For example, in the disclosures of Japanese Unexamined Patent Publication (Kokai) No. 61-250905 and Japanese Unexamined Patent Publication (Kokai) No. 2-832, the problems arise of a short accelerated lifetime of the insulation resistance or a large drop in the capacity under a DC bias.

DISCLOSURE OF THE INVENTION

The present invention was made in view of these circumstances and has as its object to provide a method of manufacturing an electronic device containing a dielectric layer such as a multi-layer ceramic capacitor able to satisfy both of the capacity-temperature characteristics of the X7R characteristic (EIA standard) and the B characteristic (EIAJ standard), even when the dielectric layer is superthin, and having a small change in the capacity under a DC electric field along with time and further having a long accelerated lifetime of the insulation resistance and a small drop in capacity under a DC bias. Further, the present invention has as its object to provide a method of manufacturing a dielectric ceramic composition suitable for use as a dielectric layer of an electronic device containing a dielectric layer such as a multi-layer ceramic capacitor having such superior characteristics.

To achieve the above object, the present invention provides a method of manufacturing a dielectric ceramic composition comprising:

a main component expressed by the formula $Ba_mTiO_{2+n}$, wherein the "m" in the formula is $0.995 \leq m \leq 1.010$, "n" is $0.995 \leq n \leq 1.010$, and the ratio of Ba and Ti is $0.995 \leq Ba/Ti \leq 1.010$, a second subcomponent including a sintering aid containing silicon oxide as a main component, and other subcomponents, comprising the steps of:

mixing the main component and at least part of the subcomponents except for the second subcomponent and to prepare a pre-calcination powder, calcining the pre-calcination powder to prepare a calcined powder, and mixing at least the second subcomponent in said calcined powder to obtain a dielectric ceramic composition having ratios of the subcomponents to the main component of predetermined molar ratios.

According to a first aspect of the present invention, said second subcomponent has a composition expressed by $(Ba,Ca)_xSiO_{2+x}$ (where, x=0.8 to 1.2);

said other subcomponents include at least:
  a first subcomponent including at least one type of compound selected from MgO, Cao, BaO, SrO, and $Cr_2O_3$,
  a third subcomponent including at least one type of compound selected from $V_2O_5$, $MoO_3$, and $WO_3$, and
  a fourth subcomponent including an oxide of R (where, R is at least one type of element selected from Y, Dy, Tb, Gd, and Ho); and
  at least the second subcomponent is mixed in the calcined powder to obtain a dielectric ceramic composition having ratios of the subcomponents to 100 moles of the main component of:
    the first subcomponent: 0.1 to 3 moles,
    the second subcomponent: 2 to 12 moles,
    the third subcomponent: 0.1 to 3 moles, and
    the fourth subcomponent: 0.1 to 10.0 moles (where, the number of moles of the fourth subcomponent is the ratio of R by itself).

According to a second aspect of the invention, said second subcomponent has a composition expressed by $(Ba,Ca)_xSiO_{2+x}$ (where, x=0.8 to 1.2);

said other subcomponents include at least:
  a first subcomponent including at least one type of compound selected from MgO, CaO, BaO, SrO, and $Cr_2O_3$,
  a third subcomponent including at least one type of compound selected from $V_2O_5$, $MoO_3$, and $WO_3$,
  a fourth subcomponent including an oxide of R (where, R is at least one type of element selected from Y, Dy, Tb, Gd, and Ho), and
  a fifth subcomponent including Mno; and
  at least the second subcomponent is mixed in the calcined powder to obtain a dielectric ceramic composition having ratios of the subcomponents to 100 moles of the main component of:
    the first subcomponent: 0.1 to 3 moles,
    the second subcomponent: 2 to 12 moles,
    the third subcomponent: 0.1 to 3 moles,
    the fourth subcomponent: 0.1 to 10.0 moles (where, the number of moles of the fourth subcomponent is the ratio of R by itself), and
    the fifth subcomponent: 0.05 to 1.0 mole.

Note that in this specification, the oxides comprising the main component and the subcomponents are expressed by stoichiochemical compositions, but the oxidized state of the oxides may also deviate from the stoichiochemical compositions. The ratios of the subcomponents are found by converting the amounts of the metals contained in the oxides comprising the subcomponents to oxides of the above stoichiochemical compositions. Further, it is possible to use the above oxides and their mixtures and composite oxides as powder materials of the dielectric ceramic composition, but it is also possible to suitably select, mix, and use various compounds changing to the above oxides or composite oxides by firing, for example, carbonates, oxalates, nitrates, hydroxides, and organic metal compounds may be used.

Further, the ratio between Ba and Ca in the second subcomponent may be any ratio. It is also possible to include only one.

In the present invention, the average grain size of the main component is not particularly limited, but preferably is 0.1 to 0.7 $\mu$m, more preferably 0.2 to 0.7 $\mu$m.

In the present invention, preferably, said pre-calcination powder is prepared and calcined so that the molar ratio of the components contained in the pre-calcination powder becomes a (Ba+metal element of the first subcomponent)/(Ti+metal element of the fourth subcomponent) of less than 1 or a (Ba+metal element of the fourth subcomponent)/(Ti+metal element of the first subcomponent) of more than 1.

In the present invention, preferably when preparing the pre-calcination powder, the first subcomponent is always included in the pre-calcination powder.

In the present invention, the pre-calcination powder including the fourth subcomponent is calcined at a temperature of at least 500° C. to less than 1200° C., More preferably 600° C. to 900° C. Further, when the pre-calcination powder does not contain the material of the fourth subcomponent, the calcination temperature is preferably 600 to 1300° C., more preferably 900 to 1300° C., particularly preferably 1000 to 1200° C.

Note that the calcination may be performed a plurality of times.

The calcined powder may have mixed into it at least the second subcomponent. If necessary, it may have mixed in it at least one of the main component, first subcomponent, third subcomponent, fourth subcomponent, and fifth subcomponent and the composition of the finally obtained dielectric ceramic composition may be made the above range.

According to a third aspect of the present invention, there is provided a method of manufacturing a multi-layer ceramic capacitor comprised of an internal electrode comprised of Ni or an Ni alloy and a dielectric layer alternately stacked, the dielectric layer including by molar ratio 100 moles of $BaTiO_3$, 0.1 to 3 moles of at least one type of MgO and CaO, 0.05 to 1.0 mole of MnO, 0.1 to 5 moles of $Y_2O_3$, 0.1 to 3 mole of $V_2O_5$, and 2 to 12 moles of $Ba_aCa_{1-a}SiO_3$ (where "a" is a number of 0 to 1), comprising
  pre-mixing and calcining at 900° C. to 1300° C. $BaTiO_3$ and at least one type of MgO, CaO and a compound changing to MgO or CaO by heat treatment and using at least 70 wt % of the calcined material with respect to the dielectric material as a whole.

According to a fourth aspect of the present invention, there is provided a method of manufacturing a multi-layer ceramic capacitor comprised of an internal electrode comprised of Ni or an Ni alloy and a dielectric layer alternately stacked, the dielectric layer including by molar ratio 100 moles of $BaTiO_3$, 0.1 to 3 moles of at least one type of MgO and CaO, 0.05 to 1.0 mole of MnO, 0.1 to 5 moles of $Y_2O_3$, 0.1 to 3 mole of $V_2O_5$, and 2 to 12 moles of $Ba_aCa_{1-a}SiO_3$ (where "a" is a number of 0 to 1), comprising
  pre-mixing and calcining at 900° C. to 1300° C. $BaTiO_3$ and at least one type of compound selected from MgO, CaO and a compound changing to MgO or CaO by heat treatment, MnO or a compound changing to MnO by heat treatment, $Y_2O_3$ or a compound changing to $Y_2O_3$ by heat treatment, and $V_2O_5$ or a compound changing to $V_2O_5$ by heat treatment and using at least 70 wt % of the calcined material with respect to the dielectric material as a whole.

In the third and fourth aspects of the present invention, the average grain size of the $BaTiO_3$ is preferably 0.2 to 0.7 $\mu$m. Note that in the third and fourth aspects of the present invention, the number of moles of the $Y_2O_3$ is not the number of moles of Y alone, but the number of moles of the $Y_2O_3$.

In the method of manufacturing a dielectric ceramic composition of the related art, $Ba_mTiO_{2+n}$ and additives are mixed once to prepare a mixed powder of the dielectric ceramic composition or a dielectric paste. In the method of the related art, however, segregation of the additives (first to fifth subcomponents) etc. occurs in the dielectric ceramic composition after firing and variance of the composition ends up arising between crystals. Due to this segregation, the permittivity and insulation resistance of the dielectric deteriorates.

According to the present invention, by mixing and calcining at least one of the main component, first subcomponent, third subcomponent, fourth subcomponent, and fifth subcomponent, that is, all except the second subcomponent, variance in the composition between crystal particles can be suppressed. As a result, the precipitation of the segregated phases can be suppressed and the size of the segregated phases may be controlled. Therefore, according to the present invention, it is possible to produce a dielectric ceramic composition suitable for use for a multi-layer ceramic capacitor or other electronic device containing a dielectric layer satisfying both of the X7R characteristic and B characteristic and having a small change in capacity under a DC electric field along with time, a long accelerated lifetime of the insulation resistance, a small drop in capacity under a DC electric field, and a superior reliability. This has been first discovered by the present inventors etc.

Further, the dielectric ceramic composition obtained by the method of manufacture according to the present invention can be fired even under a reducing atmosphere since it does not contain elements such as Pb, Bi, and Zn which evaporate and disperse. Therefore, it becomes possible to use Ni or an Ni alloy or another base metal as an internal electrode and possible to reduce the costs.

Further, the dielectric ceramic composition obtained by the method of manufacture according to the present invention satisfies the X7R characteristic and B characteristic, has a small deterioration of the capacity aging characteristic and insulation resistance due to application of the DC electric field, and a superior reliability even if fired under a reducing atmosphere. Therefore, the method of the present invention is promising as an effective technique for suppressing the deterioration of the rate of change of the temperature in the high temperature region along with a reduction in the thickness of the layer of the multi-layer capacitor.

Further, the dielectric ceramic composition obtained by the method of manufacture according to the present invention can provide a product with a small detrimental impact on the environment due to disposal etc. after use since it does not contain Pb, Bi, or another substance.

Further, in the method of manufacture according to the present invention, it is possible to realize a dielectric ceramic composition of a homogeneous structure with little different phases formed by precipitation of additives and possible to improve the permittivity and insulation resistance of the dielectric ceramic composition. Further, in the method of manufacture according to the present invention, it is possible to provide a multi-layer ceramic capacitor having a high reliability since it is possible to prevent structural defects arising incidentally.

Further, it is possible to easily produce a multi-layer ceramic capacitor or other electronic device containing a dielectric layer with a capacity-temperature characteristic satisfying the X7R characteristic and B characteristic since precipitation of different phases can be suppressed without changing the composition of the additives.

BEST MODE FOR WORKING THE INVENTION

Multi-layer Ceramic Capacitor

Figure 1:
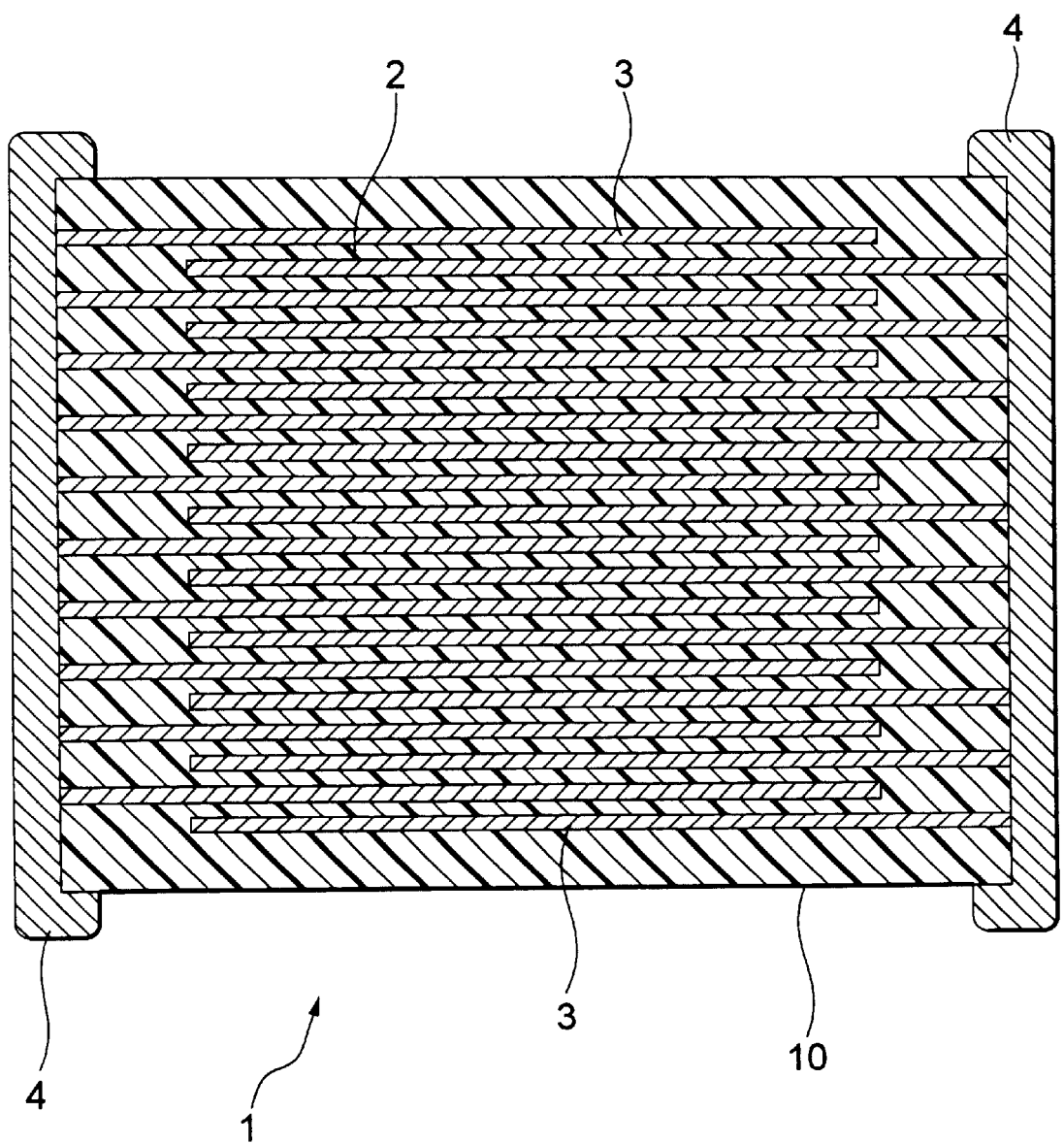
FIG. 1 is a sectional view of a multi-layer ceramic capacitor according to one embodiment of the present invention.

Before explaining the method of manufacturing a dielectric ceramic composition according to the present invention, an explanation will be given of a multi-layer ceramic capacitor.

As shown in FIG. 1, a multi-layer ceramic capacitor 1 according to an embodiment of the present invention has a capacitor device body 10 of a configuration of dielectric layers 2 and internal electrode layers 3 stacked alternately. At the two ends of the capacitor device body 10 are formed a pair of external electrodes 4 conductive with the internal electrode layers 3 alternately arranged inside the device body 10. The shape of the capacitor device body 10 is not particularly limited, but normally is made a parallelepiped. Further, the dimensions are not particularly limited and may be made suitable dimensions in accordance with the application. Usually, however, they are (0.6 to 5.6 mm, preferably 0.6 to 3.2 mm)×(0.3 to 5.0 mm, preferably 0.3 to 1.6 mm)×(0.3 to 1.9 mm, preferably 0.3 to 1.6 mm).

The internal electrode layers 3 are stacked so that end faces thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3.

Dielectric Layers 2

Each of the dielectric layers 2 contains the dielectric ceramic composition obtained by the method of manufacture of the present invention.

The dielectric ceramic composition obtained by the method of manufacture of the present invention is a dielectric ceramic composition comprising at least:

a main component expressed by the formula $Ba_mTiO_{2+n}$, wherein the "m" in the formula is $0.995 \leq m \leq 1.010$, "n" is $0.995 \leq n \leq 1.010$, and the ratio of Ba and Ti is $0.995 \leq Ba/Ti \leq 1.010$, a first subcomponent including at least one type of compound selected from MgO, CaO, BaO, SrO, and $Cr_2O_3$, a said second subcomponent expressed by $(Ba,Ca)_xSiO_{2+x}$ (where, x=0.8 to 1.2);

a third subcomponent including at least one type of compound selected from $V_2O_5$, $MoO_3$, and $WO_3$, and a fourth subcomponent including an oxide of "R" (where, "R" is at least one type of element selected from Y, Dy, Tb, Gd, and Ho).

The ratios of the subcomponents to the main component are, with respect to 100 moles of the main component:

the first subcomponent: 0.1 to 3 moles, the second subcomponent: 2 to 12 moles, the third subcomponent: 0.1 to 3 moles, and the fourth subcomponent: 0.1 to 10.0 moles.

Note that the ratio of the fourth subcomponent is not the molar ratio of the R oxide, but the molar ratio of R alone. That is, when for example using an oxide of Y as the fourth subcomponent, a ratio of the fourth subcomponent of 1 mole does not mean the ratio of the $Y_2O_3$ is 1 mole, but the ratio of Y is 1 mole.

In this specification, the oxides constituting the main component and the subcomponents are expressed by stoichiochemical compositions, but the oxidized state of the oxides may also deviate from the stoichiochemical compositions. The ratios of the subcomponents, however, are found by conversion from the amounts of the metals contained in the oxides constituting the subcomponents to the oxides of the above stoichiochemical compositions. Further, it is possible to use the above oxides and their mixtures and composite oxides as powder materials of the dielectric ceramic composition, but it is also possible to suitably select, mix, and use various compounds changing to the above oxides or composite oxides by firing, for example, carbonates, oxalates, nitrates, hydroxides, and organic metal compounds may be used.

The reasons for limiting the contents of the above subcomponents are as follows.

If the content of the first subcomponent (MgO, CaO, BaO, SrO, and $Cr_2O_3$) is too small, the effect of suppression of the drop in capacity under a DC bias tends to become insufficient. On the other hand, if the content is too large, the drop in the permittivity tends to become remarkable and the accelerated life of the insulation resistance tends to become short. Note that the ratios of the oxides in the first subcomponent may be any ratios.

The BaO and the CaO in the second subcomponent $[(Ba,Ca)_xSiO_{2+x}]$ are also contained in the first subcomponent, but the composite oxide $(Ba,Ca)_xSiO_{2+x}$ has a low melting point, so it has good reactivity with the main component. Therefore, in the present invention, the BaO and/or CaO are also added as the above composite oxide. If the content of the second subcomponent is too small, the sinterability tends to become poor, the accelerated life of the insulation resistance tends to become short, and it tends to become harder for the capacity-temperature characteristic to satisfy the standard of the X7R characteristic. On the other hand, if the content is too great, the permittivity is low, the capacity drops and the accelerated life of the insulation resistance becomes short.

The "x" in the $(Ba,Ca)_xSiO_{2+x}$ is preferably 0.8 to 1.2, more preferably 0.9 to 1.1. If the "x" is too small, that is, if the $SiO_2$ is too great, the main component of $Ba_mTiO_{2+n}$ will be reacted with and the dielectric property will end up deteriorating. On the other hand, if the "x" is too large, the melting point will become high and the sinterability will be deteriorated, so this is not preferable. Note that the ratios of Ba and Ca in the second subcomponent are any ratios. A subcomponent containing just one of Ba and Ca is also possible.

If the content of the third subcomponent ($V_2O_5$, $MoO_3$, and $WO_3$) is too small, the breakdown voltage tends to drop and it tends to be difficult for the capacity-temperature characteristic to satisfy the standard of the X7R characteristic. On the other hand, if the content is too great, the initial insulation resistance tends to fall. Note that the ratios of the oxides in the third subcomponent may be any ratios.

If the content of the fourth subcomponent (R oxide) is too small, the accelerated life of the insulation resistance tends to become short. On the other hand, if the content is too large, the sinterability tends to deteriorate. From the viewpoint of satisfying the X7R characteristic, among the fourth subcomponents, a Y oxide, a Dy oxide, and an Ho oxide are preferred. In particular, a Y oxide is preferred since it has a high effect on improvement of the characteristic and further is inexpensive in cost.

The dielectric ceramic composition of the present invention may contain, in accordance with need, MnO as a fifth subcomponent. The fifth subcomponent exhibits the effect of promotion of the sintering and the effect of reduction of the dielectric loss (tan δ). To sufficiently obtain this effect, it is preferable that the ratio of the fifth subcomponent be at least 0.05 mole to 100 moles of the main component. If the content of the fifth subcomponent is too large, however, there is an adverse effect on the capacity-temperature characteristic, so it is preferably made not more than 1.0 mole.

Further, the dielectric ceramic composition of the present invention may also contain $Al_2O_3$ in addition to the above oxides. $Al_2O_3$ does not have much of an effect on the capacity-temperature characteristic and exhibits the effect of improvement of the sinterability, insulation resistance, and accelerated lifetime of the insulation resistance (insulation resistance lifetime). If the content of the $Al_2O_3$ is too large, however, the sinterability deteriorates and the insulation resistance falls, so the $Al_2O_3$ is preferably included in an amount of not more than 1 mole with respect to 100 moles of the main component, more preferably not more than 1 mole of the dielectric ceramic composition as a whole. Note that when at least one element of Sr, Zr, and Sn replaces the Ba or Ti in the main component constituting the perovskite structure, the Curie temperature shifts to the low temperature side, so the capacity-temperature characteristic above 125° C. deteriorates. Therefore, it is preferable not to use a $Ba_mTiO_{2+n}$ containing these elements [for example, (Ba,Sr)$TiO_3$] as a main component. There is however no particular problem with a level contained as an impurity (less than 0.1 mol % of the dielectric ceramic composition as a whole).

The average grain size of the dielectric ceramic composition of the present invention is not particularly limited and may be suitably determined in accordance with the thickness of the dielectric layers etc. from the range of for example 0.1 to 3.0 μm, preferably 0.1 to 0.7 μm. The capacity-temperature characteristic deteriorates the thinner the dielectric layers and tends to deteriorate the smaller the average grain size. Therefore, the dielectric ceramic composition of the present invention is particular effective when having to make the average grain size small, specifically, when the average grain size is 0.1 to 0.5 μm. Further, if the average grain size is made small, the insulation resistance lifetime becomes longer and further the change in the capacity under a DC electric field over time becomes smaller, so it is preferable that the average grain size be small as explained above from this viewpoint as well.

The dielectric layer 2 of the present invention is comprised of grains, grain interfaces, and grain interface phases. Further, it may be comprised of a composition having a so-called core-shell structure.

The thickness, number of layers, and other conditions of the dielectric layers comprised of the dielectric ceramic composition of the present invention may be suitably determined in accordance with the object and application. For example, the thickness of the dielectric layers is normally not more than 50 μm, particularly not more than 10 μm, per layer. The lower limit of the thickness is normally about 1 μm. The dielectric ceramic composition of the present invention is effective for the improvement of the capacity-temperature characteristic of a multi-layer ceramic capacitor having such thinned dielectric layers. Note that the number of the dielectric layers stacked is normally 2 to 400, preferably 10 to 400 or so.

The multi-layer ceramic capacitor using the dielectric ceramic composition of the present invention is suitable for use as an electronic device for equipment used at an environment of −55° C. to +125° C. Further, in this temperature range, the capacity-temperature characteristic satisfies the X7R characteristic of the EIA standard (−55 to 125° C., ΔC=±15% or less) and simultaneously satisfies the B characteristic of the EIAJ standard [rate of change of capacity of within ±10% at −25 to 85° C. (reference temperature 200° C.)].

In a multi-layer ceramic capacitor, the dielectric layers are normally subjected to an AC electric field of at least 0.02V/ $\mu$m, in particular at least 0.2V/$\mu$m, further at least 0.5V/$\mu$m, to generally not more than 5V/$\mu$m and a DC electric field of not more than 5V/$\mu$m superposed over this, but the temperature characteristic of the capacity is extremely stable even when such electric fields are applied.

Internal Electrode Layers 3

The electroconductive material contained in the internal electrode layers 3 is not particularly limited, but a base metal may be used since the material constituting the dielectric layers 2 has resistance to reduction. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt %.

Note that the Ni or Ni alloy may contain P and other various types of trace components in amounts of not more than 0.1 wt % or so.

The thickness of the internal electrode layers may be suitably determined in accordance with the application etc., but is usually 0.5 to 5 $\mu$m, preferably 0.5 to 2.5 $\mu$m, more preferably 1 to 2 $\mu$m or so.

External Electrodes 4

The electroconductive material contained in the external electrodes 4 is not particularly limited, but in the present invention an inexpensive Ni, Cu, or alloys of the same may be used.

The thickness of the external electrodes may be suitably determined in accordance with the application etc., but is usually 10 to 100 $\mu$m or so.

Method of Manufacturing Multi-Layer Ceramic Capacitor

The multi-layer ceramic capacitor produced using the method of manufacturing a dielectric ceramic composition according to the present invention is produced by preparing a green chip using the usual printing method or sheet method which uses pastes, firing the green chip, then printing or transferring and sintering the external electrodes. The method of manufacture will be explained in detail below.

First, a powder of a dielectric ceramic composition including a dielectric paste is prepared. The powder of the $BaTiO_3$ in the powder of the dielectric ceramic composition may be not only a powder obtained by the so-called solid phase method of mixing the ingredients, then calcining and pulverizing them, but also a powder obtained by the so-called liquid phase method such as the oxalate method or hydrothermal synthesis method.

In the present invention, before obtaining the above powder of a dielectric ceramic composition, calcination is performed. That is, at least one component from among all components other than the second subcomponent $(Ba,Ca)_x SiO_{2+x}$, that is, the main component $(Ba_mTiO_{2+n})$, the first subcomponent (for example, Mgo or CaO or a compound changing to MgO or CaO by heat treatment), the third subcomponent (for example, $V_2O_5$ or a compound changing to $V_2O_5$ by heat treatment), the fourth subcomponent (for example, $Y_2O_3$ or a compound changing to $Y_2O_3$ by heat treatment), and the fifth subcomponent (for example, MnO or a compound changing to MnO by heat treatment), is mixed and dried to prepare a pre-calcination powder.

Note that as the compound changing to MgO or CaO by heat treatment, $MgCO_3$, $MgCl_2$, $MgSO_4$, $Mg(NO_3)_2$, $Mg(OH)_2$, $(MgCO_3)_4Mg(OH)_2$, $CaCO_3$, $CaCl_3$, $CaSO_4$, $Ca(NO_3)_2$, Mg alkoxide, Ca alkoxide, etc. or hydrates of these may be mentioned. Further, as the compound changing to MnO by heat treatment, $MnCO_3$, $MnCl_2$, $MnSO_4$, $Mn(NO_3)_2$, etc. or hydrates of these may be mentioned. Further, as the compound changing to $Y_2O_3$ by heat treatment, $YCl_3$, $Y_2(SO_4)_3$, $Y(NO_3)_3$, $Y(CH_3COO)_3$, Y alkoxide, etc. or hydrates of these may be mentioned. Further, as the compound changing to $V_2O_5$ by heat treatment, $VCl_5$, $V_2(SO_4)_5$, $V(NO_3)_5$, etc. or hydrates of these may be mentioned.

The pre-calcination powder is then calcined. The calcination conditions are not particularly limited, but the calcination is preferably performed under the following conditions:

Rate of temperature rise: 5 to 400° C./hour, in particular 100 to 300° C./hour

Holding temperature: 500 to 1300° C., in particular 500 to 1200° C.

Temperature holding time: 0.5 to 6 hours, in particular 1 to 3 hours

Atmosphere: in the air or in nitrogen

The calcined powder is roughly pulverized by an alumina roll etc., then at least the second subcomponent $(Ba,ca)_xSiO_{2+x}$ is added and, according to need, the remaining additives are added to obtain the mixed powder of the above final composition. Next, the mixed powder is according to need mixed by a ball mill etc. and dried so as to obtain a powder of a dielectric ceramic composition having the composition of the present invention.

The molar ratio of each component in the calcined powder is not particularly limited, but preferably satisfies the following relations. That is, a (Ba+metal element of the first subcomponent)/(Ti+metal element of the fourth subcomponent) of less than 1 or a (Ba+metal element of the fourth subcomponent)/(Ti+metal element of the first subcomponent) of more than 1 is preferable. When in this range, the accelerated lifetime of the insulation resistance is particularly improved.

Further, the calcined powder preferably always includes the first subcomponent. When the total weight of the first subcomponent in the powder of the final composition is 100 wt %, preferably the first subcomponent is contained in the calcined powder of preferably at least 30 wt %, more preferably at least 50 wt %.

When the powder of the dielectric ceramic composition which is finally obtained is 100 wt %, the calcined powder is then preferably mixed into the added components in an amount of at least 70 wt %, more preferably at least 80 wt %, particularly preferably at least 90 wt %. If the ratio of the calcined powder is too small, the accelerated lifetime of the insulation resistance tends to become short and the drop in capacity under a DC bias tends to become remarkable.

Next, the powder of the finally obtained dielectric ceramic composition is made into a coating to prepare a dielectric layer paste. The dielectric layer paste may be an organic-based coating obtained by mixing the powder of the dielectric ceramic composition and an organic vehicle and may be a water-based coating.

In the state before coating, the grain size of the powder of the dielectric ceramic composition is normally an average grain size of 0.1 to 3 $\mu$m, preferably 0.1 to 0.7 $\mu$m.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, methylethylketone, acetone, toluene, and other organic solvents in accordance with the printing method, sheet method, or other method of use.

Further, when using a water-based paint as the dielectric layer paste, it is sufficient to knead a water-based vehicle comprised of a water-based binder or dispersant etc. dissolved in water together with the dielectric layer ingredient. The water-based binder used for the water-based vehicle is not particularly limited. For example, a polyvinyl alcohol, cellulose, water-based acrylic resin, etc. may be used.

The internal electrode layer paste is prepared by kneading the electroconductive material comprised of the above various types of dielectric metals and alloys or various types of oxides changing to the above electroconductive materials after firing, an organic metal compound, resinate, etc. (electroconductive material) together with the above organic vehicle. The electroconductive material in the paste etc. is not particularly limited in shape. Spheres, scales, etc. may be mentioned. Further, these shapes may be mixed.

The external electrode paste may be prepared in the same way as the above internal electrode layer paste.

The content of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total content of these is preferably not more than 10 wt %.

Note that as the plasticizer, for example, polyethylene glycol, a phthalic acid ester (for example, dioctyl phthalate or dibutyl phthalate) etc. may be used. Further, as the dispersant, for example, oleic acid, rosin, glycerin, octadecylamine, an oleic acid ester, mencedene oil, etc. may be used.

In particular, when preparing a dielectric layer paste (slurry), preferably the content of the powder of the dielectric ceramic composition in the paste is made about 50 to 80 wt % with respect to the paste as a whole and the content of the binder made 2 to 5 wt %, the plasticizer 0.1 to 5 wt %, the dispersant 0.1 to 5 wt %, and the solvent 20 to 50 wt %.

When using a printing method, the dielectric layer paste and the internal electrode layer paste are successively printed on the PET or other substrate. The result is then cut into a predetermined shape, then the pastes are peeled off from the substrate to form a green chip.

Further, when using a sheet method, a dielectric layer paste is used to form a green sheet, the internal electrode layer paste is printed on top of this, then these are stacked to form a green chip.

Before firing, the green chip is processed to remove the binder. This processing for removing the binder may be performed under ordinary conditions. If Ni or an Ni alloy or another base metal is used for the electroconductive material of the internal electrode layers, the processing is preferably performed under the following conditions:

Rate of temperature rise: 5 to 300° C./hour, in particular 10 to 100° C./hour

Holding temperature: 180 to 400° C., in particular 200 to 300° C.

Temperature holding time: 0.5 to 24 hours, in particular 5 to 20 hours

Atmosphere: in the air

The atmosphere when firing the green chip may be suitably determined in accordance with the type of the electroconductive material in the internal electrode layer paste, but when using Ni or an Ni alloy or another base metal as the electroconductive material, the oxygen partial pressure in the sintering atmosphere is preferably made $10^{-7}$ to $10^{-13}$ atmospheres, more preferably $10^{-10}$ to $10^{-12}$ atmospheres. If the oxygen partial pressure is less than this range, the electroconductive material of the internal electrode layers becomes abnormally sintered and ends up breaking in the middle in some cases. Further, if the oxygen partial pressure is more than the above range, the internal electrode layers tend to oxidize.

Further, the holding temperature at the time of firing is preferably 1100 to 1400° C., more preferably 1150 to 1400° C., still more preferably 1200 to 1300° C. If the holding temperature is less than the above range, the densification becomes insufficient, while if over that range, there is a tendency toward breaking of the electrodes due to abnormal sintering of the internal electrode layers, deterioration of the capacity-temperature characteristic due to dispersion of the material comprising the internal electrode layers, and reduction of the dielectric ceramic composition.

The various conditions when firing other than the above conditions are preferably selected from the following ranges:

Rate of temperature rise: 100 to 900° C./hour, in particular 200 to 900° C./hour Temperature holding time: 0.5 to 8 hours, in particular 1 to 3 hours Cooling rate: 50 to 500° C./hour, in particular 200 to 300° C./hour Note that the firing atmosphere is preferably a reducing atmosphere. As the atmospheric gas, for example, it is preferable to use a wet mixed gas of $N_2$ and $H_2$.

When firing in a reducing atmosphere, the capacitor device body is preferably annealed. The annealing process is for reoxidizing the dielectric layers. Since this enables the insulation resistance lifetime to be remarkably prolonged, the reliability is improved.

The oxygen partial pressure in the annealing atmosphere is preferably $10^{-4}$ to $10^{-7}$ atmospheres. If the oxygen partial pressure is less than the above range, reoxidation of the dielectric layers is difficult, while if over that range, the internal electrode layers tend to oxide.

The holding temperature at the time of annealing is preferably not more than 1200° C., in particular 500 to 1200° C. If the holding temperature is less than the above range, the oxidation of the dielectric layers becomes insufficient, so the insulation resistance tends to become low and the insulation resistance lifetime short. On the other hand, when the holding temperature exceeds the above range, not only do the internal electrode layers oxidize and the capacity fall, but also the internal electrode layers end up reacting with the dielectric material resulting in a tendency toward deterioration of the capacity-temperature characteristic, a fall in the insulation resistance, and a fall in the insulation resistance lifetime. Note that the annealing may be comprised of only a temperature raising process and temperature reducing process. That is, the temperature holding time may also be made zero. In this case, the holding temperature is synonymous with the maximum temperature.

The various conditions when annealing other than the above conditions are preferably determined from the following ranges:

Temperature holding time: 0.5 to 12 hours, in particular 6 to 10 hours cooling rate: 50 to 600° C./hour, in particular 100 to 300° C./hour Note that for the atmospheric gas, wet $N_2$ gas etc. may be used.

In the processing for removing the binder, the firing, and the annealing, for example, a wetter etc. may be used to wet the $N_2$ gas or mixed gas. In this case, the temperature of the water is preferably 5 to 75° C.

The processing for removing the binder, firing, and annealing may be performed consecutively or independently. When preferably performing these consecutively, after processing to remove the binder, the atmosphere is changed without cooling, then the temperature is raised to the holding temperature for firing, the firing performed, then the chip is cooled, the atmosphere is changed when the holding temperature of the annealing is reached, and then annealing is performed. On the other hand, when performing these independently, at the time of firing, preferably the temperature is raised to the holding temperature at the time of the processing for removing the binder in an $N_2$ gas or wet $N_2$ gas atmosphere, then the atmosphere is changed and the temperature is further raised. Preferably, the chip is cooled to the holding temperature of the annealing, then the atmosphere changed again to an $N_2$ gas or wet $N_2$ gas atmosphere and the cooling continued. Further, at the time of annealing, the temperature may be raised to the holding temperature in an $N_2$ gas atmosphere, then the atmosphere changed or the entire annealing process may be performed in a wet $N_2$ gas atmosphere.

The thus obtained capacitor device body is, for example, end polished using barrel polishing or sandblasting etc., then printed or transferred with an external electrode paste and fired to form the external electrodes 4. The firing conditions of the external electrode paste are for example preferably 600 to 800° C. for 10 minutes to 1 hour or so in a wet mixed gas of $N_2$ and $H_2$. Further, in accordance with need, the surfaces of the external electrodes 4 may be formed with a covering layer using a plating technique etc.

The multi-layer ceramic capacitor of the present invention produced in this way has a capacity-temperature characteristic which satisfies the X7R characteristic of the EIA standard and the B characteristic of the EIAJ standard even when the dielectric layer is a super thin one of a thickness of not more than 4 μm. Further, the multi-layer ceramic capacitor of the present invention has a small change of the capacity under a DC electric field along with time, a long accelerated lifetime of the insulation resistance, and a small drop in capacity under a DC bias.

The thus produced multi-layer ceramic capacitor of the present invention is mounted by soldering it onto a printed circuit board for use in various types of electronic equipment.

Note that the present invention is not limited to the above embodiments and may be modified in various ways within the scope of the invention.

For example, the dielectric ceramic composition obtained by the method of manufacture according to the present invention may not only be used for a multi-layer ceramic capacitor, but also another electronic device formed with a dielectric layer.

EXAMPLES

Below, the present invention will be explained with reference to more detailed examples, but the present invention is not limited to these examples.

Example 1

Samples A1 to A10 of multi-layer ceramic capacitors were fabricated by the procedure explained below.

First, the following pastes were prepared.

Dielectric Layer Paste

First, ingredients of the main component and ingredients of the subcomponents were prepared. As the ingredient of the main component, $BaTiO_3$ having a grain size of 0.2 to 0.7 μm obtained by the hydrothermal synthesis method was used. Carbonates were used for the ingredients of MgO and MnO and oxides were used for the ingredients of the other subcomponents. As the magnesium carbonate used as the ingredient of the MgO, $(MgCO_3)_4Mg(OH)_2 \cdot 5H_2O$ was used. Further, as the carbonate used as the ingredient of the MnO, $MnCO_3$ was used.

Further, $(Ba_{0.6}Ca_{0.4})SiO_3$ was used for the ingredient of the second subcomponent. Note that $(Ba_{0.6}Ca_{0.4})SiO_3$ was produced by wet mixing $BaCO_3$, $CaCO_3$, and $SiO_2$ using a ball mill for 16 hours, drying the mixture, firing it at 1150° C. in air, then wet pulverizing it using a ball mill for 100 hours.

First, the main component of $BaTiO_3$ and the ingredient of the first subcomponent, that is, magnesium carbonate, were mixed and dried to prepare a pre-calcination powder. As shown in Table 1, the pre-calcination powder contained 2.1 moles of magnesium carbonate converted to MgO with respect to 100 moles of $BaTiO_3$. Further, the molar ratio of specific components in the pre-calcination powder, that is, (Ba+metal element Mg in the first subcomponent)/(Ti+metal element Y in the fourth subcomponent) was investigated, whereupon it was found to be 1.021 as shown in Table 1. Further, the molar ratio (Ba+metal element Y in the fourth subcomponent)/(Ti+metal element Mg in the first subcomponent) was investigated, whereupon it was found to be 0.9794 as shown in Table 1.

Next, the pre-calcination powder was calcined. The calcination conditions were as follows:

Rate of temperature rise: 300° C./hour

Holding temperature (Ti in Table 1): 500 to 1350° C.

Temperature holding time: 3 hours

Atmosphere: in the air

The material obtained by this calcination was pulverized by a pulverizer for 1 hour to obtain a calcined powder, then, as shown in Table 2, 3.0 moles of $(Ba_{0.6}Ca_{0.4})SiO_3$, 0.375 mole of $MnCO_3$, 0.1 mole of $V_2O_5$, and 2.1 moles of $Y_2O_3$ (number of moles of Y of 4.2 moles, same below) were added to the calcined powder, the result was wet-mixed for 16 hours by a zirconia ball mill, then dried to obtain a powder of a dielectric ceramic composition of the final composition.

100 parts by weight of the powder of the dielectric ceramic composition obtained in this way, 4.8 parts by weight of acrylic resin, 40 parts by weight of methylene chloride, 20 parts by weight of ethyl acetate, 6 parts by weight of mineral spirits, and 4 parts by weight of acetone were mixed using a ball mill for 16 hours to make a paste.

Internal Electrode Layer Paste 44.6 parts by weight of Ni particles of an average grain size of 0.4 μm, 52.0 parts by weight of terpineol, 3.0 parts by weight of ethyl cellulose, and 0.4 part by weight of benzotriazole were kneaded using a triple-roll to make a paste.

External Electrode Paste 100 parts by weight of Cu particles of an average grain size of 2 μm, 35 parts by weight of an organic vehicle (8 parts by weight of an ethyl cellulose resin dissolved in 92 parts by weight of butyl carbitol), and 7 parts by weight of butyl carbitol were kneaded together to make a paste.

Preparation of Green Chip

The above dielectric layer paste was used to form a green sheet of a thickness of 5 µm on a PET film. An internal electrode paste was printed on the surface of the green sheet, then the sheet was peeled from the PET film. Next, four layers of the green sheets printed with the internal electrode paste were stacked over a plurality of protective green sheets (ones without the internal electrode layer paste printed on it) and pressed under conditions of 120° C. and 15 Pa to obtain a green chip.

Firing

First, the green chip was cut to predetermined sizes which were then processed to remove the binder, fired, and annealed under the following conditions, then formed with external electrodes to obtain the Samples A1 to A10 of the multi-layer ceramic capacitor of the configuration shown in FIG. 1.

Conditions for Processing to Remove Binder

Rate of temperature rise: 15° C./hour
Holding temperature: 280° C.
Temperature holding time: 8 hours
Atmosphere: in the air Firing Conditions Rate of temperature rise: 200° C./hour
Holding temperature: 1270° C.
Temperature holding time: 2 hours
Cooling rate: 300° C./hour
Atmospheric gas: wet $N_2+H_2$ mixed gas
Oxygen partial pressure: $10^{-12}$ atmospheres Annealing Conditions Holding temperature: 1000° C.
Temperature holding time: 3 hours
Cooling rate: 300° C./hour
Atmospheric gas: wet $N_2$ gas
Oxygen partial pressure: $10^{-6}$ atmospheres Note that for the wetting of the atmospheric gas at the time of the processing for removing the binder, the firing, and the annealing, a wetter with a water temperature of 35° C. was used.

External Electrodes

The external electrodes were formed by polishing the end faces of the fired body by sandblasting, then transferring the external electrode paste to the end faces and firing them there in a wet $N_2+H_2$ atmosphere at 800° C. for 10 minutes.

The thus obtained samples had a size of 3.2 mm×1.6 mm×1.4 mm, had four dielectric layers sandwiched between internal electrode layers, and the dielectric layer had a thickness of 3 µm. The thickness of each internal electrode layer was 1.3 µm.

Disk-shaped samples were also prepared in addition to the samples of the capacitors. These disk-shaped samples were of the same compositions of the dielectric layer of the above capacitors and were fired under the same conditions. In-Ga electrodes of diameters of 5 mm were coated on the two surfaces of the samples.

The samples were evaluated as to the following characteristics.

Relative Permittivity ($\epsilon_r$)

The capacity of the disk-shaped samples was measured at 25° C. by an LCR meter under conditions of 1 kHz and 1 Vrms. Further, the relative permittivity was calculated from the capacity, electrode dimensions, and thickness of the samples. The results are shown in Table 2. The higher the relative permittivity the better.

Breakdown Voltage (VB)

The breakdown voltage was found by applying a DC voltage to a sample of the multi-layer chip capacitor at a speed of temperature rise of 100V/sec and measuring the voltage when a leakage current of 100 mA was observed. The results are shown in Table 2. The higher the breakdown voltage, the better.

IR Lifetime Under DC Electric Field (High Temperature Accelerated Lifetime: HALT in Table)

Samples of multi-layer chip capacitors were subjected to acceleration tests at 180° C. under an electric field of 10 V/µm. The time until the insulation resistance fell below $2\times10^5\Omega$ was made the lifetime. The results are shown in Table 2. The longer the lifetime, the better the durability of the capacitor.

Capacity-Temperature Characteristic (TCC in Table)

The capacity of samples of multi-layer chip capacitors was measured in a temperature range of −55 to +125° C. to investigate if the X7R characteristic was satisfied. Note that the characteristic was measured using an LCR meter at a measurement voltage of 1V. It was investigated if the rate of change of the capacity was within ±15% (reference temperature 20° C.). Samples which satisfied this are shown indicated as "good" and samples not satisfying them as "poor".

Further, for the B characteristic, the capacity was measured by an LCR meter at −25 to 85° C. at a measurement voltage of 1V. It was investigated if the rate of change of the capacity was within ±10% (reference temperature 20° C.). Samples which satisfied this are shown indicated as "good" and samples not satisfying them as "poor".

Change in Capacity Under DC Electric Field Along With Time

A 2.5V DC electric field (7.5V voltage applied to sample) per 1 µm thickness of the dielectric layer was applied to a sample of the multi-layer chip capacitor at 40° C. for 100 hours, the sample was allowed to stand at room temperature for 24 hours in a no-load state, then the capacity was measured. The amount of change $\Delta C$ from the capacity $C_0$ (initial capacity) before the application of the DC electric field was found and the rate of change $\Delta C/C_0$ was calculated. Note that the capacity was measured under the above conditions.

Drop in Capacity Under DC Bias

The electrostatic capacity was measured at room temperature by an LCR meter while applying a DC electric field of 0 to 13V/µm and the electric field giving a capacity under a DC electric field of −50% was found. It is preferably at least 6.3 V/µm, if possible at least 6.5V/µm.

TABLE 1

| Sample | Main comp. BaTiO³ | 1st subcomp. | 3rd sub-comp. | 4th subcomp. | | 5th sub-comp. MnO | Formula (1) | Formula (2) | Cal. temp. T1 (° C.) |
|---|---|---|---|---|---|---|---|---|---|
| A1 | 100 | 2.1 | MgO | | | | | | |
| A2 | 100 | 2.1 | MgO | | | | 1.021 | 0.9794 | 600 |
| A3 | 100 | 2.1 | MgO | | | | 1.021 | 0.9794 | 700 |
| A4 | 100 | 2.1 | MgO | | | | 1.021 | 0.9794 | 800 |
| A5 | 100 | 2.1 | MgO | | | | 1.021 | 0.9794 | 900 |
| A6 | 100 | 2.1 | MgO | | | | 1.021 | 0.9794 | 1000 |
| A7 | 100 | 2.1 | MgO | | | | 1.021 | 0.9794 | 1100 |
| A8 | 100 | 2.1 | MgO | | | | 1.021 | 0.9794 | 1200 |
| A9 | 100 | 2.1 | MgO | | | | 1.021 | 0.9794 | 1300 |
| A10 | 100 | 2.1 | MgO | | | | 1.021 | 0.9794 | 1350 |
| A11 (Comp. Ex.) | | | | | | | | | None |
| B1 | 100 | 2.1 | CaO | | | | 1.021 | 0.9794 | 1000 |
| B2 | 100 | 2.1 | CaO | | | | 1.021 | 0.9794 | 1100 |
| C1 | 100 | 2.1 | MgO | | 4.2 | $Y_2O_3$ | 0.9798 | 1.0206 | 700 |
| C2 | 100 | 2.1 | MgO | | 4.2 | $Y_2O_3$ | 0.9798 | 1.0206 | 800 |
| C3 | 100 | 2.1 | MgO | | 4.2 | $Y_2O_3$ | 0.9798 | 1.0206 | 900 |
| C4 | 100 | 2.1 | MgO | | 4.2 | $Y_2O_3$ | 0.9798 | 1.0206 | 1000 |
| C5 | 100 | 2.1 | MgO | | 4.2 | $Y_2O_3$ | 0.9798 | 1.0206 | 1100 |
| C6 | 100 | 2.1 | MgO | | 4.2 | $Y_2O_3$ 0.375 | 0.9798 | 1.0206 | 700 |
| C7 | 100 | 2.1 | MgO | | 4.2 | $Y_2O_3$ 0.375 | 0.9798 | 1.0206 | 800 |
| C8 | 100 | 2.1 | MgO | | 4.2 | $Y_2O_3$ 0.375 | 0.9798 | 1.0206 | 900 |
| C9 | 100 | 2.1 | MgO | | 4.2 | $Y_2O_3$ 0.375 | 0.9798 | 1.0206 | 1000 |
| C10 | 100 | 2.1 | MgO | | 4.2 | $Y_2O_3$ 0.375 | 0.9798 | 1.0206 | 1100 |
| D1 | 100 | 2.1 | MgO | 0.1 | 4.2 | $Y_2O_3$ 0.375 | 0.9798 | 1.0206 | 500 |
| D2 | 100 | 2.1 | MgO | 0.1 | 4.2 | $Y_2O_3$ 0.375 | 0.9798 | 1.0206 | 600 |
| D3 | 100 | 2.1 | MgO | 0.1 | 4.2 | $Y_2O_3$ 0.375 | 0.9798 | 1.0206 | 700 |
| D4 | 100 | 2.1 | MgO | 0.1 | 4.2 | $Y_2O_3$ 0.375 | 0.9798 | 1.0206 | 800 |
| D5 | 100 | 2.1 | MgO | 0.1 | 4.2 | $Y_2O_3$ 0.375 | 0.9798 | 1.0206 | 900 |
| D6 | 100 | 2.1 | MgO | 0.1 | 4.2 | $Y_2O_3$ 0.375 | 0.9798 | 1.0206 | 1000 |
| D7 | 100 | 2.1 | MgO | 0.1 | 4.2 | $Y_2O_3$ 0.375 | 0.9798 | 1.0206 | 1100 |
| D8 | 100 | 2.1 | MgO | 0.1 | 4.2 | $Y_2O_3$ 0.375 | 0.9798 | 1.0206 | 1200 |
| D9 | 100 | 2.1 | MgO | 0.1 | 4.2 | $Y_2O_3$ 0.375 | 0.9796 | 1.0206 | 1300 |
| E1 | 100 | 2.1 | MgO | 0.1 | 4.2 | $Dy_2O_3$ 0.375 | 0.9798 | 1.0206 | 800 |
| E2 | 100 | 2.1 | MgO | 0.1 | 4.2 | $Ho_2O_3$ 0.375 | 0.9798 | 1.0206 | 800 |
| E3 | 100 | 2.5 | MgO | 0.1 | 3.0 | $Gd_2O_3$ 0.375 | 0.9951 | 1.0049 | 800 |
| E4 (C. Ex.) | | | | | | $Gd_2O_3$ | | | None |
| E5 | 100 | 2.5 | MgO | 0.1 | 2.8 | $Tb_4O_7$ 0.375 | 0.9971 | 1.0029 | 800 |
| E6 (C. Ex.) | | | | | | $Tb_4O_7$ | | | None |

Note:
1st and 4th subcomponents calculated by atomic percentage.
Formula (1): (Ba + 1st subcomponent)/(Ti + 4th subcomponent)
Formula (2): (Ba + 4th subcomponent)/(Ti + 1st subcomponent)

TABLE 2

| | Composition of components additionally added at time of coating (mol) | | | | | | TCC | | | | | | | Change in electro-static capacity with time (%) | DC-bias electro-static capacity halving field (V/μm) | VB (V) |
|---|---|---|---|---|---|---|---|---|---|---|---|---|---|---|---|---|
| Sample | Main comp. BaTiO₃ | 1st sub-comp. MgO | 4th sub-comp. $Y_2O_3$ | 5th sub-comp. MnO | 3rd sub-comp. $V_2O_5$ | 2nd sub-comp. (BaCa) SiO₃ | ΔC -55 (%) | ΔC +85 (%) | ΔC +125 (%) | B character-istic | X7R | HALT (hr) | εr | | | |
| A1 | | | 4.2 | 0.375 | 0.1 | 3 | 2.2 | -7.5 | -10.4 | Good | Good | 34.0 | 2350 | -5.5 | 6.3 | 388 |
| A2 | | | 4.2 | 0.375 | 0.1 | 3 | 1.1 | -7.0 | -10.3 | Good | Good | 38.1 | 2355 | -5.5 | 6.3 | 395 |
| A3 | | | 4.2 | 0.375 | 0.1 | 3 | 0.7 | -7.3 | -8.8 | Good | Good | 73.6 | 2358 | -5.4 | 6.4 | 398 |
| A4 | | | 4.2 | 0.375 | 0.1 | 3 | 0.8 | -7.0 | -8.8 | Good | Good | 40.4 | 2354 | -5.4 | 6.4 | 414 |
| A5 | | | 4.2 | 0.375 | 0.1 | 3 | 0.3 | -6.9 | -9.9 | Good | Good | 61.1 | 2343 | -3.9 | 7.0 | 397 |
| A6 | | | 4.2 | 0.375 | 0.1 | 3 | -2.1 | -7.1 | -10.8 | Good | Good | 73.6 | 2382 | -3.4 | 7.2 | 378 |
| A7 | | | 4.2 | 0.375 | 0.1 | 3 | -2.6 | -7.7 | -11.3 | Good | Good | 78.4 | 2401 | -2.4 | 6.8 | 362 |
| A8 | | | 4.2 | 0.375 | 0.1 | 3 | -2.6 | -8.3 | -12.6 | Good | Good | 69.3 | 2337 | -2.5 | 6.8 | 353 |

TABLE 2-continued

| | | Composition of components additionally added at time of coating (mol) | | | | | | TCC | | | | | | Change in electrostatic capacity with time (%) | DC-bias electrostatic capacity halving field (V/μm) | |
|---|---|---|---|---|---|---|---|---|---|---|---|---|---|---|---|---|
| Sample | Main comp. $BaTiO_3$ | 1st sub-comp. MgO | 4th sub-comp. $Y_2O_3$ | 5th sub-comp. MnO | 3rd sub-comp. $V_2O_5$ | 2nd sub-comp. (BaCa)$SiO_3$ | ΔC −55 (%) | ΔC +85 (%) | ΔC +125 (%) | B characteristic | X7R | HALT (hr) | εr | | | VB (V) |
| A9 | | | 4.2 | 0.375 | 0.1 | 3 | −3.3 | −8.6 | −13.8 | Good | Good | 54.8 | 2315 | −2.4 | 6.5 | 313 |
| A10 | | | 4.2 | 0.375 | 0.1 | 3 | −3.8 | −10.0 | −14.9 | Good | Good | 42.1 | 2287 | −2.8 | 6.3 | 296 |
| A11 (C. Ex.) | 100 | 2.1 | 4.2 | 0.375 | 0.1 | 3 | 2.8 | −7.5 | −10.3 | Good | Good | 34.3 | 2358 | −5.5 | 6.2 | 364 |
| B1 | | | 4.2 | 0.375 | 0.1 | 3 | −2.3 | −3.4 | −6.5 | Good | Good | 53.9 | 2591 | −6.5 | 6.5 | 342 |
| B2 | | | 4.2 | 0.375 | 0.1 | 3 | −3.4 | −5.2 | −7.0 | Good | Good | 59.5 | 2638 | −4.7 | 6.5 | 336 |
| C1 | | | | 0.375 | 0.1 | 3 | 0.9 | −5.5 | −7.3 | Good | Good | 92.3 | 2329 | −3.2 | 7.2 | 418 |
| C2 | | | | 0.375 | 0.1 | 3 | 0.7 | −5.8 | −7.7 | Good | Good | 88.4 | 2348 | −3.6 | 7.2 | 419 |
| C3 | | | | 0.375 | 0.1 | 3 | 0.7 | −6.0 | −8.1 | Good | Good | 62.4 | 2352 | −4.2 | 7.1 | 408 |
| C4 | | | | 0.375 | 0.1 | 3 | 0.0 | −6.4 | −8.8 | Good | Good | 76.1 | 2374 | −3.5 | 7.0 | 382 |
| C5 | | | | 0.375 | 0.1 | 3 | −0.9 | −7.3 | −9.8 | Good | Good | 77.2 | 2418 | −2.2 | 6.8 | 370 |
| C6 | | | | | 0.1 | 3 | 0.9 | −5.5 | −7.0 | Good | Good | 102.3 | 2366 | −3.1 | 7.5 | 423 |
| C7 | | | | | 0.1 | 3 | 0.6 | −5.4 | −7.4 | Good | Good | 89.8 | 2381 | −3.2 | 7.4 | 419 |
| C8 | | | | | 0.1 | 3 | 0.3 | −5.8 | −7.8 | Good | Good | 68.8 | 2397 | −3.3 | 7.2 | 400 |
| C9 | | | | | 0.1 | 3 | −0.1 | −6.0 | −8.5 | Good | Good | 64.8 | 2392 | −3.6 | 7.1 | 388 |
| C10 | | | | | 0.1 | 3 | −0.5 | −6.7 | −10.1 | Good | Good | 69.2 | 2351 | −3.1 | 7.0 | 379 |
| D1 | | | | | | 3 | 2.8 | −7.1 | −10.1 | Good | Good | 59.7 | 2356 | −3.0 | 6.6 | 366 |
| D2 | | | | | | 3 | 1.1 | −6.5 | −8.1 | Good | Good | 99.6 | 2384 | −3.0 | 7.3 | 427 |
| D3 | | | | | | 3 | 0.5 | −6.2 | −7.5 | Good | Good | 121.0 | 2390 | −3.1 | 7.7 | 485 |
| D4 | | | | | | 3 | 0.5 | −5.5 | −7.7 | Good | Good | 117.5 | 2404 | −3.4 | 7.5 | 488 |
| D5 | | | | | | 3 | 0.7 | −5.9 | −8.7 | Good | Good | 105.0 | 2413 | −3.6 | 7.4 | 462 |
| D6 | | | | | | 3 | −0.5 | −6.3 | −9.8 | Good | Good | 72.0 | 2421 | −3.6 | 6.9 | 401 |
| D7 | | | | | | 3 | −1.1 | −7.1 | −10.5 | Good | Good | 84.1 | 2435 | −2.9 | 6.8 | 376 |
| D8 | | | | | | 3 | −2.4 | −8.0 | −12.8 | Good | Good | 60.3 | 2355 | −2.7 | 6.6 | 343 |
| D9 | | | | | | 3 | −3.5 | −8.5 | −13.4 | Good | Good | 41.2 | 2313 | −2.7 | 6.5 | 308 |
| E1 | | | | | | 3 | −1.2 | −10.0 | −14.3 | Good | Good | 68.1 | 2606 | −3.9 | 6.9 | 409 |
| E2 | | | | | | 3 | 0.0 | −8.3 | −10.9 | Good | Good | 64.5 | 2410 | −4.2 | 7.4 | 413 |
| E3 | | | | | | 3 | 0.5 | −17.5 | −27.9 | Poor | Poor | 26.5 | 2996 | −6.6 | 5.8 | 237 |
| E4 | 100 | 2.5 | 3.0 | 0.375 | 0.1 | 3 | 0.5 | −20.0 | −30.2 | Poor | Poor | 22.1 | 3085 | −9.3 | 5.6 | 218 |
| E5 | | | | | | 3 | 0.5 | −13.3 | −19.8 | Poor | Poor | 43.4 | 2847 | −4.3 | 6.7 | 392 |
| E6 | 100 | 2.5 | 2.8 | 0.375 | 0.1 | 3 | 0.5 | −14.2 | −22.1 | Poor | Poor | 38.2 | 2908 | −7.8 | 6.6 | 377 |

Comparative Example 1

The same procedure was followed as with the samples of Example 1 except that, as shown in Table 1 and Table 2, there was no calcination and the firing was performed using a mixed powder comprised of 100 moles of the main component of $BaTiO_3$ plus 2.1 moles of $(MgCO_3)_4Mg(OH)_2 \cdot 5H_2O$ converted to MgO, 0.375 mole of $MnCO_3$, 3.0 moles of $(Ba_{0.6}Ca_{0.4})SiO_3$, 0.1 mole of $V_2O_5$, and 2.1 moles of $Y_2O_3$ to prepare a cylindrical sample and capacitor Sample A11. This was tested in the same way as in Example 1. The results are shown in Table 2.

Example 2

The same procedure was followed as in Example 1 except, as shown in Table 1, for using CaO as the first subcomponent and performing the calcination at a temperature of 1000° C. and 1100° C. to prepare cylindrical samples and capacitor Samples B1 and B2. These were tested in the same way as in Example 1. The results are shown in Table 2.

Note that the molar ratio of specific components in the pre-calcination powder, that is, (Ba+Ca)/(Ti+Y), was investigated, whereupon it was found to be 1.021 as shown in Table 1. Further, the molar ratio (Ba+Y)/(Ti+Ca) was investigated, whereupon it was found to be 0.9794 as shown in Table 1.

Example 3

The same procedure was followed as in Example 1 except, as shown in Table 1, for further adding 2.1 moles of $Y_2O_3$ or 2.1 moles of $Y_2O_3$ and 0.375 mole of $MnCO_3$ as the fourth component in the pre-calcination powder and performing the calcination at a temperature of 700° C. to 1100° C. to prepare cylindrical samples and capacitor Samples C1 to C10. These were tested in the same way as in Example 1. The results are shown in Table 2.

Note that the molar ratio of specific components in the pre-calcination powder, that is, (Ba+Mg)/(Ti+Y), was investigated, whereupon it was found to be 0.9798 as shown in Table 1. Further, the molar ratio (Ba+Y)/(Ti+Mg) was investigated, whereupon it was found to be 1.0206 as shown in Table 1.

Example 4

The same procedure was followed as in Example 1 except, as shown in Table 1, for further adding 0.1 mole of $V_2O_5$ as the third component, 2.1 moles of $Y_2O_3$ as the fourth component, and 0.375 mole of $MnCO_3$ as the fifth component in the pre-calcination powder and performing the calcination at a temperature of 500° C. to 1300° C. to prepare cylindrical samples and capacitor Samples D1 to C9. These were tested in the same way as in Example 1. The results are shown in Table 2.

Note that the molar ratio of specific components in the pre-calcination powder, that is, (Ba+Mg)/(Ti+Y), was investigated, whereupon it was found to be 0.9798 as shown in Table 1. Further, the molar ratio (Ba+Y)/(Ti+Mg) was investigated, whereupon it was found to be 1.0206 as shown in Table 1.

Example 5

The same procedure was followed as in Example 4 except, as shown in Table 1, instead of $Y_2O_3$ as the fourth component, including $Dy_2O_3$ or $Ho_2O_3$ in the pre-calcination powder in contents of 2.1 moles and performing the calcination at a temperature of 800° C. to prepare cylindrical samples and capacitor Samples E1 and E2. These were tested in the same way as in Example 1. The results are shown in Table 2.

Note that the molar ratio of specific components in the pre-calcination powder, that is, (Ba+Mg)/(Ti+Dy or Ho), was investigated, whereupon it was found to be 0.9798 as shown in Table 1. Further, the molar ratio (Ba+Dy or Ho)/(Ti+Mg) was investigated, whereupon it was found to be 1.0206 as shown in Table 1.

Example 6

The, same procedure was followed as in Example 4 except, as shown in Table 1, instead of $Y_2O_3$ as the fourth component, including $Gd2O_3$ in the pre-calcination powder in a content of 1.5 moles (number of moles of Gd 3.0 moles, same below) and performing the calcination at a temperature of 800° C. to prepare a cylindrical sample and capacitor Sample E3. This was tested in the same way as in Example 4. The results are shown in Table 2.

Note that the molar ratio of specific components in the pre-calcination powder, that is, (Ba+Mg)/(Ti+Gd), was investigated, whereupon it was found to be 0.9951 as shown in Table 1. Further, the molar ratio (Ba+Gd)/(Ti+Mg) was investigated, whereupon it was found to be 1.0049 as shown in Table 1.

Comparative Example 2

The same procedure was followed as with the samples of Example 6 except that, as shown in Table 1 and Table 2, there was no calcination and the firing was performed using a mixed powder comprised of 100 moles of the main component of $BaTiO_3$ plus 2.5 moles of $(MgCO_3)_4Mg(OH)_2 \cdot 5H_2O$ converted to MgO, 0.375 mole of $MnCO_3$, 3.0 moles of $(Ba_{0.6}Ca_{0.4})SiO_3$, 0.1 mole of $V_2O_5$, and 1.5 moles of $Gd_2O_3$, to prepare a cylindrical sample and capacitor Sample E4. This was tested in the same way as in Example 6. The results are shown in Table 2.

Example 7

The same procedure was followed as in Example 4 except, as shown in Table 1, instead of $Y_2O_3$ as the fourth component, including $Tb_4O_7$ in the pre-calcination powder in a content of 0.7 mole (number of moles of Tb 2.8 moles, same below) and performing the calcination at a temperature of 800° C. to prepare a cylindrical sample and capacitor Sample E5. This was tested in the same way as in Example 4. The results are shown in Table 2.

Note that the molar ratio of specific components in the pre-calcination powder, that is, (Ba+Mg)/(Ti+Tb), was investigated, whereupon it was found to be 0.9971 as shown in Table 1. Further, the molar ratio (Ba+Tb)/(Ti+Mg) was investigated, whereupon it was found to be 1.0029 as shown in Table 1.

Comparative Example 3

The same procedure was followed as with the samples of Example 1 except that, as shown in Table 1 and Table 2, there was no calcination and the firing was performed using a mixed powder comprised of 100 moles of the main component $BaTiO_3$ plus 2.5 moles of $(MgCO_3)_4Mg(OH)_2 \cdot 5H_2O$ converted to MgO, 0.375 mole of $MnCO_3$, 3.0 moles of $(Ba_{0.6}Ca_{0.4})SiO_3$, 0.1 mole of $V_2O_5$, 0.7 mole of $V_2O_3$, and 0.7 mole of $Tb_4O_7$ to prepare a cylindrical sample and capacitor Sample E6. This was tested in the same way as in Example 7. The results are shown in Table 2.

Example 8

The same procedure was followed as in Example 1 except for including the moles of magnesium carbonate shown in Table 3, converted to MgO, in 60 to 80 moles of $BaTiO_3$ and additionally adding the not calcined main component and subcomponents to the calcined powder to give a percent weight of the calcined component of 60 to 80 wt % as shown in Table 4 to prepare cylindrical samples and capacitor Samples F1 to F3. These were tested in the same way as in Example 1. The results are shown in Table 4.

Note that the molar ratio of specific components in the pre-calcination powder, that is, (Ba+Mg)/(Ti+Y), was investigated, whereupon it was found to be 1.021 as shown in Table 3. Further, the molar ratio (Ba+Y)/(Ti+Mg) was investigated, whereupon it was found to be 0.9794 as shown in Table 3.

TABLE 3

| | Composition at time of calcination (mol) | | | | | | | Calcination |
|---|---|---|---|---|---|---|---|---|
| Sample no. | Main comp. $BaTiO_3$ | 1st subcomp. | 3rd subcomp. $V_2O_5$ | 4th subcomp. | 5th subcomp. MnO | Formula (1) | Formula (2) | temp. T1 (° C.) |
| F1 | 60 | 1.26 | MgO | | | 1.021 | 0.9794 | 1000 |
| F2 | 80 | 1.68 | MgO | | | 1.021 | 0.9794 | 1000 |
| F3 | 70 | 1.47 | MgO | | | 1.021 | 0.9794 | 1000 |

Note:

First and fourth subcomponents calculated by atomic percentage.

Formula (1): (Ba + 1st subcomponent)/(Ti + 4th subcomponent)

Formula (2): (Ba + 4th subcomponent)/(Ti + 1st subcomponent)

TABLE 4

| | Composition of components additionally added at time of coating (mol) | | | | | | |
|---|---|---|---|---|---|---|---|
| Sample | Main comp. BaTiO$_3$ | 1st subcomp. MgO | 4th subcomp. Y$_2$O$_3$ | 5th subcomp. MnO | 3rd subcomp. V$_2$O$_5$ | 2nd subcomp. (BaCa)SiO$_3$ | Calcined comp. wt % |
| F1 | 40 | 0.84 | 4.2 | 0.375 | 0.1 | 3 | 60 |
| F2 | 20 | 0.42 | 4.2 | 0.375 | 0.1 | 3 | 80 |
| F3 | 30 | 0.63 | 4.2 | 0.375 | 0.1 | 3 | 70 |

| | TCC | | | | | | | Change in electrostatic capacity with time (%) | DC-bias electrostatic capacity halving field (V/μm) | VB (V) |
|---|---|---|---|---|---|---|---|---|---|---|
| Sample | ΔC −55 (%) | ΔC +85 (%) | ΔC +125 (%) | B characteristic | X7R | HALT (hr) | εr | | | |
| F1 | 2.0 | −7.5 | −10.1 | Good | Good | 37.7 | 2368 | −5.2 | 6.3 | 360 |
| F2 | −2.2 | −7.0 | −10.1 | Good | Good | 64.2 | 2379 | −4.3 | 6.8 | 382 |
| F3 | −2.1 | −6.9 | −10.0 | Good | Good | 48.7 | 2363 | −4.8 | 6.5 | 371 |

Evaluation

As shown in Tables 1 to 4, it was confirmed that the X7R characteristic and the B characteristic could be satisfied by all of the examples of the present invention. Further, by comparing Sample A11 of Comparative Example 1 and Samples A1 to A10, B1, B2, C1 to C10, D1 to D9, E1, E2, and F1 to F3 of the Example, it was confirmed that the examples of the invention had long accelerated lifetimes of the insulation resistance, little change along with time of the electrostatic capacity under a DC electric field, and a high electrostatic capacity halving field under a DC electric field.

Further, by comparing for example Sample A11 of the comparative example and Samples D2 to D5 of the examples of the present invention, it could be confirmed that the breakdown voltage could also be improved by suitably selecting the composition of the pre-calcination powder and the calcination temperature.

Further, by observing the results of Samples C1 to C10 and D1 to D9, it could be confirmed that when the fourth subcomponent was included in the pre-calcination powder, the calcination temperature is preferably from 500° C. to less than 1200° C., preferably 600 to 900° C. Further, by observing the results of Samples A1 to A10, it could be confirmed that when the ingredient of the fourth subcomponent is not included in the pre-calcination powder, the calcination temperature is preferably 600 to 1300° C., more preferably 900 to 1300° C., particularly preferably 1000 to 1200° C.

Further, by comparing Sample A1 to A10 and D1 to D9, it could be confirmed that the insulation resistance lifetime and breakdown voltage characteristic are particularly improved when the molar ratio of the components included in the pre-calcination powder, that is, (Ba+metal element of the first component)/(Ti+metal element of the fourth component) is less than 1 or the molar ratio (Ti+metal element of the fourth component)/(Ba+metal element of the first component) is over 1.

Still further, by comparing Sample F1 to F3, it could be confirmed that at least 70 wt %, if possible at least 80 wt %, of calcined powder is preferably used with respect to 100 wt % of the dielectric material as a whole. Further, it was confirmed that the DC-bias characteristic declined remarkably if less than 70 wt %.

Further, by observing the results of Sample E3 to E6, it was confirmed that even when using a Tb oxide or Gd oxide as the fourth subcomponent, with the calcination method of the present invention, while the X7R characteristic was not satisfied, the other characteristics (in particular the insulation resistance lifetime) were improved.

What is claimed is:

1. A method of manufacturing a dielectric ceramic composition comprising:

a main component expressed by the formula Ba$_m$TiO$_{2+n}$, wherein the "m" in the formula is 0.995≦m≦1.010, "n" is 0.995≦n≦1.010, and the ratio of Ba and Ti is 0.995≦Ba/Ti≦1.010, a second subcomponent including a sintering aid containing silicon oxide as a main component, and other subcomponents, comprising the steps of:

mixing the main component and at least part of the subcomponents except the second subcomponent to prepare a pre-calcination powder, calcining the pre-calcination powder to prepare a calcined powder, and mixing at least the second subcomponent in said calcined powder to obtain a dielectric ceramic composition having ratios of the subcomponents to the main component of predetermined molar ratios, wherein said other subcomponents include at least:
 a first subcomponent including at least one type of compound selected from MgO, CaO, BaO, SrO, and Cr$_2$O$_3$,
 a third subcomponent including at least one type of compound selected from V$_2$O$_5$ MoO$_3$, and WO$_2$, and
 a fourth subcomponent including an oxide of R (where, R is at least one type of element selected from Y, Dy, Tb, Gd, and Ho); and
 at least the second subcomponent is mixed in the calcined powder to obtain a dielectric ceramic composition having ratios of the subcomponents to 100 moles of the main component of:

the first subcomponent: 0.1 to 3 moles, the second subcomponent: 2 to 12 moles, the third subcomponent: 0.1 to 3 moles, and the fourth subcomponent: 0.1 to 10.0 moles (where, the number of moles of the fourth subcomponent is the ratio of R by itself), and said pre-calcination powder is prepared and calcined so that the molar ratio of the components contained in the pre-calcination powder becomes a (Ba+metal element of the first subcomponent)/(Ti+metal element of the fourth subcomponent) of less than 1 or a (Ba+metal element of the fourth subcomponent)/(Ti+metal element of the first subcomponent) of more than 1.

2. The method of manufacturing a dielectric ceramic composition as set forth in claim 1, wherein said second subcomponent has a composition expressed by $(Ba, Ca)_x SiO_{2+x}$ (where, x=0.8 to 1.2).

3. The method of manufacturing a dielectric ceramic composition as set forth in claim 1, wherein a fifth subcomponent including MnO is mixed in the pre-calcination powder and/or the calcined powder to obtain a dielectric ceramic composition having ratios of the subcomponents to 100 moles of the main component of:

the first subcomponent: 0.1 to 3 moles, the second subcomponent: 2 to 12 moles, the third subcomponent: 0.1 to 3 moles, the fourth subcomponent: 0.1 to 10.0 moles (where, the number of moles of the fourth subcomponent is the ratio of R by itself), and the fifth subcomponent: 0.05 to 1.0 mole.

4. The method of manufacturing a dielectric ceramic composition as set forth in claim 1, wherein when preparing the pre-calcination powder, the first subcomponent is always included in the pre-calcination powder.

5. The method of manufacturing a dielectric ceramic composition as set forth in claim 1, wherein the pre-calcination powder is calcined at a temperature of at least 500° C. to less than 1200° C.

6. The method of manufacturing a dielectric ceramic composition as set forth in claim 5, wherein the calcination is performed a plurality of times.

7. The method of manufacturing a dielectric ceramic composition as set forth in claim 1, wherein the average grain size of the main component is 0.1 to 0. 7 $\mu$m.

8. The method of manufacturing a dielectric ceramic composition as set forth in claim 1, wherein the calcined powder is used in an amount of at least 70 wt % with respect to 100 wt % of the dielectric material as a whole.

9. A method of manufacturing an electronic device containing a dielectric layer wherein the dielectric layer is formed using a dielectric ceramic composition obtained by the method as set forth in claim 8.

10. A method of manufacturing a multi-layer ceramic capacitor comprised of an internal electrode comprised of Ni or an Ni alloy and a dielectric layer alternately stacked, the dielectric layer including by molar ratio 100 moles of $BaTiO_3$, 0.1 to 3 moles of at least one type of MgO and CaO, 0.05 to 1.0 mole of MnO, 0.1 to 5 moles of $Y_2O_3$, 0.1 to 3 mole of $V_2O_5$, and 2 to 12 moles of $Ba_a Ca_{1-a} SiO_3$ (where "a" is a number of 0 to 1), comprising:

pre-mixing $BaTiO_3$ and at least one type of MgO, CaO and a compound changing to MgO or CaO by heat treatment in order to make a pre-calcination powder, calcining the pre-calcination powder at 900° C. to 1300° C., and using at least 70 wt % of the calcined material with respect to the dielectric material as a whole, wherein said pre-calcination powder is prepared and calcined so that the molar ratio of the components contained in the pre-calcination powder becomes a (Ba+Mg+Ca)/(Ti+Y) of less than 1 or a (Ba+Mg+Ca)/(Ti+Y) of more than 1.

11. A method of manufacturing a multi-layer ceramic capacitor comprised of an internal electrode comprised of Ni or an Ni alloy and a dielectric layer alternately stacked, the dielectric layer including by molar ratio 100 moles of $BaTiO_3$, 0.1 to 3 moles of at least one type of MgO and CaO, 0.05 to 1.0 mole of MnO, 0.1 to 5 moles of $Y_2O_3$, 0.1 to 3 mole of $V_2O_5$, and 2 to 12 moles of $Ba_a Ca_{1-a} SiO_3$ (where "a" is a number of 0 to 1), comprising:

pre-mixing $BaTiO_3$ and at least one type of MgO, CaO and a compound changing to MgO or CaO by heat treatment, MnO or a compound changing to MnO by heat treatment, $Y_2O_3$ or a compound changing to $Y_2O_3$ by heat treatment, and $V_2O_5$ or a compound changing to $V_2O_5$ by heat treatment in order to make a pre-calcination powder, calcining the pre-calcination powder at 900° C. to 1300° C., and using at least 70 wt % of the calcined material with respect to the dielectric material as a whole, wherein said pre-calcination powder is prepared and calcined so that the molar ratio of the components contained in the pre-calcination powder becomes a (Ba+Mg+Ca)/(Ti+Y) of less than 1 or a (Ba+Mg+Ca)/(Ti+Y) of more than 1.

12. The method of manufacturing a multi-layer ceramic capacitor as set forth in claim 10, wherein the average grain size of the $BaTiO_3$ is 0.2 to 0.7 $\mu$m.

13. The method of manufacturing a multi-layer ceramic capacitor as set forth in claim 11, wherein the average grain size of the $BaTiO_3$ is 0.2 to 0.7 $\mu$m.

* * * * *